United States Patent
Yuan et al.

(10) Patent No.: US 12,177,795 B2
(45) Date of Patent: Dec. 24, 2024

(54) TECHNIQUES FOR DETECTING MAXIMUM PERMISSIBLE EXPOSURE (MPE) EVENTS IN WIRELESS COMMUNICATIONS

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 17/794,906

(22) PCT Filed: Feb. 23, 2021

(86) PCT No.: PCT/CN2021/077370
§ 371 (c)(1),
(2) Date: Jul. 22, 2022

(87) PCT Pub. No.: WO2021/169931
PCT Pub. Date: Sep. 2, 2021

(65) Prior Publication Data
US 2023/0058401 A1    Feb. 23, 2023

(30) Foreign Application Priority Data
Feb. 25, 2020   (WO) ................ PCT/CN2020/076527

(51) Int. Cl.
H04W 52/36    (2009.01)
H04W 24/10    (2009.01)

(52) U.S. Cl.
CPC ......... *H04W 52/367* (2013.01); *H04W 24/10* (2013.01); *H04W 52/365* (2013.01)

(58) Field of Classification Search
CPC .. H04W 52/367; H04W 24/10; H04W 52/365
See application file for complete search history.

(56) References Cited

U.S. PATENT DOCUMENTS

| | | | |
|---|---|---|---|
| 11,368,926 B2 | 6/2022 | Sampath et al. | |
| 2018/0368081 A1* | 12/2018 | Akkarakaran | ........ H04W 52/42 |

(Continued)

FOREIGN PATENT DOCUMENTS

| | | |
|---|---|---|
| CN | 110225575 A | 9/2019 |
| CN | 110536397 A | 12/2019 |

(Continued)

OTHER PUBLICATIONS

Interdigital Inc: "Remaining Issues for MPE Issues Mitigation", TSG-RAN Working Group 4 (Radio) #94-e, R4-2000197, 3rd Generation Partnership Project, Mobile Competence Centre, 650, Route Des Lucioles, F-06921 Sophia-Antipolis Cedex, France, vol. RAN WG4, No. Online, Feb. 24, 2020-Mar. 6, 2020, Feb. 13, 2020, XP052403360, 9 pages, Sections 2.1 and 2.4.

(Continued)

*Primary Examiner* — Duc C Ho
(74) *Attorney, Agent, or Firm* — Arent Fox Schiff LLP

(57) ABSTRACT

Aspects described herein relate to detecting maximum permissible exposure (MPE) events and/or reporting cell metrics related to MPE events. A cell group metric for multiple cells configured in inter-band carrier aggregation (CA) can be measured. Based on the cell group metric, occurrence of a maximum permissible exposure (MPE) event can be detected, and/or the cell group metric can be reported to one or more cells of the multiple cells based on detecting occurrence of the MPE event.

30 Claims, 8 Drawing Sheets

(56) References Cited

U.S. PATENT DOCUMENTS

2019/0261289 A1    8/2019  Raghavan et al.
2020/0367230 A1*  11/2020  Raghavan ............ H04W 72/044
2021/0243743 A1*  8/2021  Bai ..................... H04W 72/044

FOREIGN PATENT DOCUMENTS

WO        2018111844 A1    6/2018
WO        2019160669 A1    8/2019
WO        2019199858      10/2019
WO    WO-2021052716 A1 *  3/2021  ............ H04W 24/10

OTHER PUBLICATIONS

Interdigital: "L2/3 Aspects of MPE Mitigation", 3GPP RAN WG2 Meeting #109-e, R2-2000178, 3rd Generation Partnership Project, Mobile Competence Centre, 650, Route Des Lucioles, F-06921 Sophia-Antipolis Cedex, France, vol. RAN WG2, No. e-meeting, Feb. 24, 2020-Mar. 6, 2020, Feb. 13, 2020, 5 Pages, XP052355370, Section 2, Appendix B.

Supplementary European Search Report—EP21760958—Search Authority—The Hague—Mar. 11, 2024.

3GPP TS 38.321: "3rd Generation Partnership Project, Technical Specification Group Radio Access Network, NR, Medium Access Control (MAC) Protocol Specification (Release 15)", V15.8.0 (Dec. 2019), 3GPP Standard, Technical Specification, 3rd Generation Partnership Project (3GPP), Mobile Competence Centre, 650, Route Des Lucioles, F-06921 Sophia-Antipolis Cedex, France, vol. RAN WG2, No. V15.8.0 , Jan. 7, 2020 (Jan. 7, 2020), pp. 1-78, section 1, section 5.1, section 5.4.1, 6.1.3.9.

Huawei, et al., "On MPE Enhancement for Rel-16", 3GPP TSG-RAN WG4 Meeting #92bis, R4-1912404, Oct. 18, 2019 (Oct. 18, 2019), 3 pages, the whole document.

International Search Report and Written Opinion—PCT/CN2020/076527—ISA/EPO—Nov. 26, 2020.

International Search Report and Written Opinion—PCT/CN2021/077370—ISA/EPO—May 13, 2021.

Nokia, et al., [Draft] "LS on MPE Enhancements", TSG-RAN Working Group 4 (Radio) #94-e, R4-2001383, Feb. 14, 2020 (Feb. 14, 2020), 2 pages, section 1.

Nokia, et al., "UE FR2 MPE Enhancements and Solutions", 3GPP Draft, R4-2001382, 3GPP RAN WG4 Meeting #94-e, 3rd Generation Partnership Project (3GPP), Mobile Competence Centre, 650, Route Des Luciles, F-06921 Sophia-Antipolis Cedex, France, vol. RAN WG4, No. Online, Feb. 24, 2020-Mar. 6, 2020, Feb. 14, 2020 (Feb. 14, 2020), XP051851300, 5 Pages, Retrieved from the Internet: URL:https://ftp.3gpp.org/tsg_ran/WG4_Radio/TSGR4_94_e/Docs/R4-2081382.zip R4-2001382 FR2 UE PE Enhancements.doc [retrieved on Feb. 14, 2020] the Whole Document.

ZTE: "Enhancement on FR2 MPE Mitigation", 3GPP TSG RAN WG1 Meeting #99, R1-1911943, Reno, US, Nov. 18-22, 2019, 3 Pages,Nov. 18, 2019 (Nov. 18, 2019) The Whole Document.

Interdigital: "L2/3 Aspects of MPE Mitigation", 3GPP RAN WG2 Meeting #109-e, R2-2000178, Feb. 24, 2020-Mar. 6, 2020, Feb. 14, 2020, pp. 1-5.

* cited by examiner

*600*

| C7 | C6 | C5 | C4 | C3 | C2 | C1 | C0 |
|----|----|----|----|----|----|----|----|
| ... ||||||||
| R | R | Cell Group Metric ||||||
| BWP ID || Beam ID C3 ||||||
| BWP ID || Beam ID C4 ||||||

*602*

| C7 | C6 | C5 | C4 | C3 | C2 | C1 | C0 |
|----|----|----|----|----|----|----|----|
| ... ||||||||
| R | R | Beam Specific Metric C3 ||||||
| BWP ID || Beam ID C3 ||||||
| R | R | Beam Specific Metric C4 ||||||
| BWP ID || Beam ID C4 ||||||

FIG. 6

TECHNIQUES FOR DETECTING MAXIMUM PERMISSIBLE EXPOSURE (MPE) EVENTS IN WIRELESS COMMUNICATIONS

CLAIM OF PRIORITY

This application is a 35 U.S.C. § 371 National Phase Application of PCT Patent Application No. PCT/CN2021/077370 filed Feb. 23, 2021, entitled "TECHNIQUES FOR DETECTING MAXIMUM PERMISSIBLE EXPOSURE (MPE) EVENTS IN WIRELESS COMMUNICATIONS," which claims priority to PCT Patent Application No. PCT/CN2020/076527, entitled "TECHNIQUES FOR DETECTING MAXIMUM PERMISSIBLE EXPOSURE (MPE) EVENTS IN WIRELESS COMMUNICATIONS" filed Feb. 25, 2020, which are assigned to the assignee hereof and hereby expressly incorporated by reference herein for all purposes.

BACKGROUND

Aspects of the present disclosure relate generally to wireless communication systems, and more particularly, to maximum permissible exposure (MPE) compliance.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

Wireless communication devices, such as user equipment (UEs), can be mandated to comply with maximum permissible exposure (MPE) to prevent exposure of radio waves to human bodies. The devices can accordingly detect MPE events where the device is close to a human body and can apply a power reduction to prevent harm caused by strong radio signals. The devices can transmit signals in certain transmission opportunities for detecting MPE, and can measure signal energy received by transmitting the signals. Where the received signal energy or other characteristics achieve a threshold, the devices can detect the MPE event and can modify transmission parameters, such as applying the power reduction, to mitigate MPE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes measuring a cell group metric for multiple cells configured in inter-band carrier aggregation (CA), detecting, based on the cell group metric, occurrence of a maximum permissible exposure (MPE) event, and reporting, to one or more cells of the multiple cells and based on detecting occurrence of the MPE event, the cell group metric.

In another aspect, a method for wireless communication is provided. The method includes receiving, from a device, an indication of a cell group metric indicative of a MPE event, wherein the cell group metric corresponds to multiple cells configured in inter-band CA, and adjusting uplink communications for the device based on the cell group metric.

In another aspect, an apparatus for wireless communication is provided that includes a transceiver, a memory configured to store instructions, and one or more processors communicatively coupled with the memory and the transceiver. The one or more processors are configured to measure a cell group metric for multiple cells configured in inter-band CA, detect, based on the cell group metric, occurrence of a MPE event, and report, to one or more cells of the multiple cells and based on detecting occurrence of the MPE event, the cell group metric.

In another aspect, an apparatus for wireless communication is provided that includes a transceiver, a memory configured to store instructions, and one or more processors communicatively coupled with the memory and the transceiver. The one or more processors are configured to receive, from a device, an indication of a cell group metric indicative of a MPE event, wherein the cell group metric corresponds to multiple cells configured in inter-band CA, and adjust uplink communications for the device based on the cell group metric.

In another aspect, an apparatus for wireless communication is provided that includes means for measuring a cell group metric for multiple cells configured in inter-band CA, means for detecting, based on the cell group metric, occurrence of a MPE event, and means for reporting, to one or more cells of the multiple cells and based on detecting occurrence of the MPE event, the cell group metric.

In another aspect, an apparatus for wireless communication is provided that includes means for receiving, from a device, an indication of a cell group metric indicative of a MPE event, wherein the cell group metric corresponds to multiple cells configured in inter-band CA, and means for adjusting uplink communications for the device based on the cell group metric.

In another aspect, a computer-readable medium, including code executable by one or more processors for wireless communications, is provided. The code includes code for measuring a cell group metric for multiple cells configured in inter-band CA, detecting, based on the cell group metric, occurrence of a MPE event, and reporting, to one or more cells of the multiple cells and based on detecting occurrence of the MPE event, the cell group metric.

In another aspect, a computer-readable medium, including code executable by one or more processors for wireless communications, is provided. The code includes code for receiving, from a device, an indication of a cell group metric indicative of a MPE event, wherein the cell group metric corresponds to multiple cells configured in inter-band CA, and adjusting uplink communications for the device based on the cell group metric.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 6 illustrates examples of bitmaps for reporting MPE event information, in accordance with various aspects of the present disclosure;

DETAILED DESCRIPTION

Figure 1:
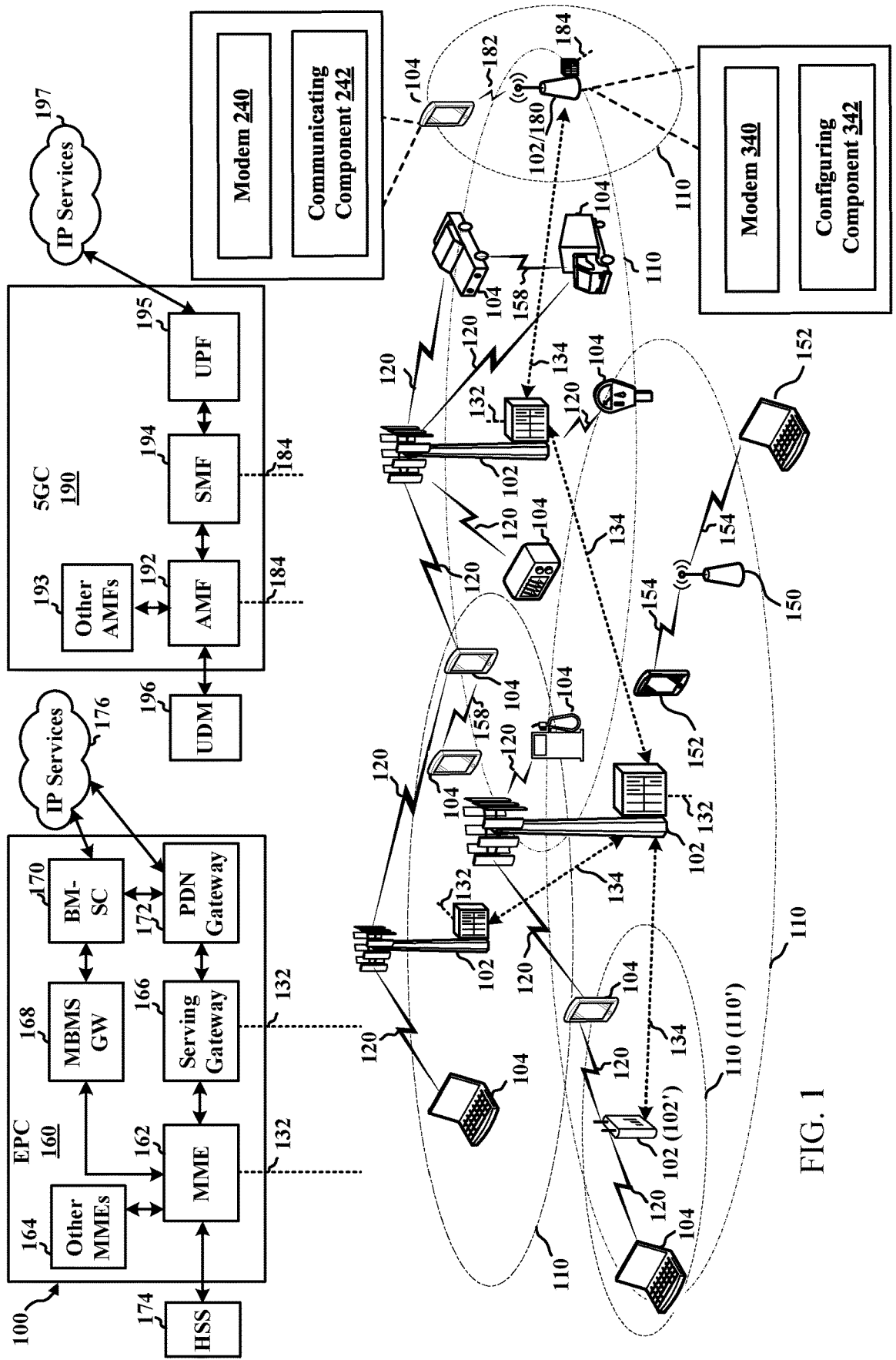
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to maximum permissible exposure (MPE) compliance when multiple component carriers (CCs) are configured for a device (e.g., a user equipment (UE)). For example, the multiple CCs can be configured in inter-band carrier aggregation (CA) where the device can transmit over each of the multiple CCs with one or more cells to improve wireless communication throughput, reliability, diversity, etc. In one specific example, the CCs can correspond to different bandwidths (e.g., one CC at 28 gigahertz (GHz) and one CC at 39 GHz, or one CC at 28 GHz and one CC at 60 GHz, etc.). In any case, the device can consider multiple (e.g., all) configured CCs in determining MPE and/or whether an MPE event is occurring.

Aspects described herein relate to measuring a cell group metric related to multiple cells and/or corresponding CCs in detecting occurrence of a MPE event. In addition, for example, a device can report the cell group metric to one or more of the multiple cells to allow the cells to take further action based on the detected MPE event, such as modifying scheduling of communications for the device, performing beam switching for the device, etc. In one example, the cell group metric can include an individual cell metric that is considered together for the multiple cells and/or corresponding CCs (e.g., summed, averaged, considered in a function, such as a maximum, minimum, etc.).

For example, such individual cell metrics can include an applied power reduction parameter value, a power backoff, a specified maximum transmit power, a power headroom, etc. The individual values can be considered together (e.g., as a sum, average, etc.) to determine a total value for the cell group metric that can be used to detect the MPE event and/or in reporting the cell group metric to the one or more cells. In another example, the cell group metric may additionally or alternatively include a metric of an individual cell (e.g., a maximum determined value, minimum determined value, etc.). In any case, the device can detect the MPE event in inter-band CA and can report one or more parameters to one or more of the multiple cells providing inter-band CA. For example, the one or more parameters may include an indication of the MPE, the group metric or individual cell metrics causing the MPE, an identification of a beam or beam measurement associated with a given cell or CC, and/or the like, as described further herein. This can allow a network detection or determination of MPE and can facilitate the network determining how to cure the MPE, which can be based on adjusting uplink communications for the device (e.g., by modifying scheduled resources, modifying CCs activated by the device, handing over the device to another CC or cell, modifying beams or antenna resources used by the device, indicating a transmission power control (TPC) command, and/or the like).

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for detecting and/or reporting information related to a MPE event when inter-band CA is configured, in accordance with aspects described herein. In addition, some nodes may have a modem 340 and scheduling component 342 for configuring and/or communicating using inter-band CA, in accordance with aspects described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, CatM1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can detect a MPE event based on multiple CCs configured in inter-band CA by determining a cell group metric that considers a total or combination of metrics associated with the multiple CCs or related cells. In one specific example, communicating component 242 can detect MPE based on a total of power reduction parameter values configured for multiple CCs or corresponding cells. In addition, for example, communicating component 242 can report the cell group metric to one or more of the cells based on detecting the MPE event or otherwise. The one or more cells can configure communications with the UE 104 based on the cell group metric. Considering the cell group metric in this regard can facilitate improved MPE event detection when multiple CCs are configured and/or can allow the cells to adjust communication parameters for the UE 104 based on the cell group metric, as described further herein.

Figure 2:
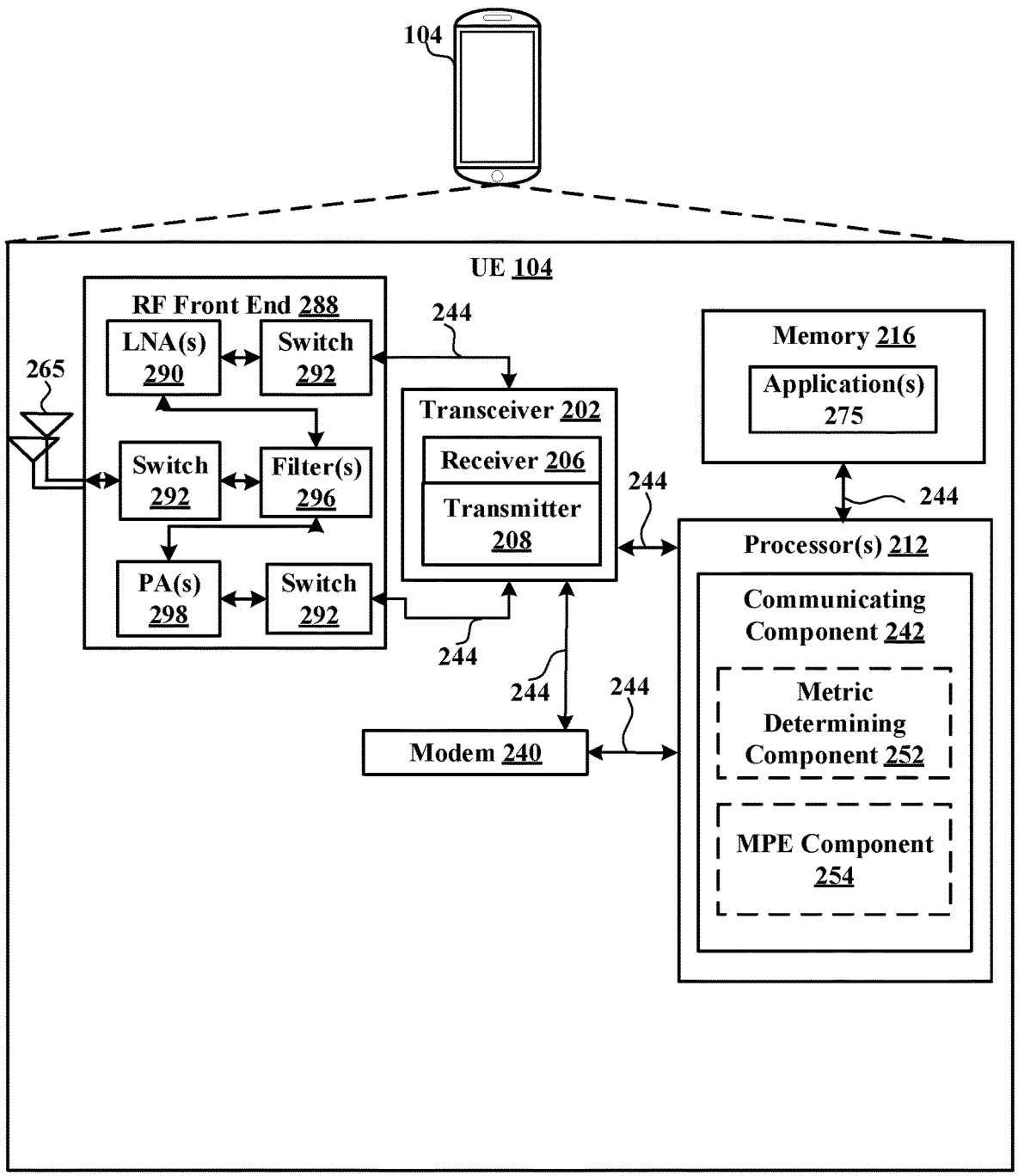
FIG. 2 is a block diagram illustrating an example of a UE, in accordance with various aspects of the present disclosure.
Figure 3:
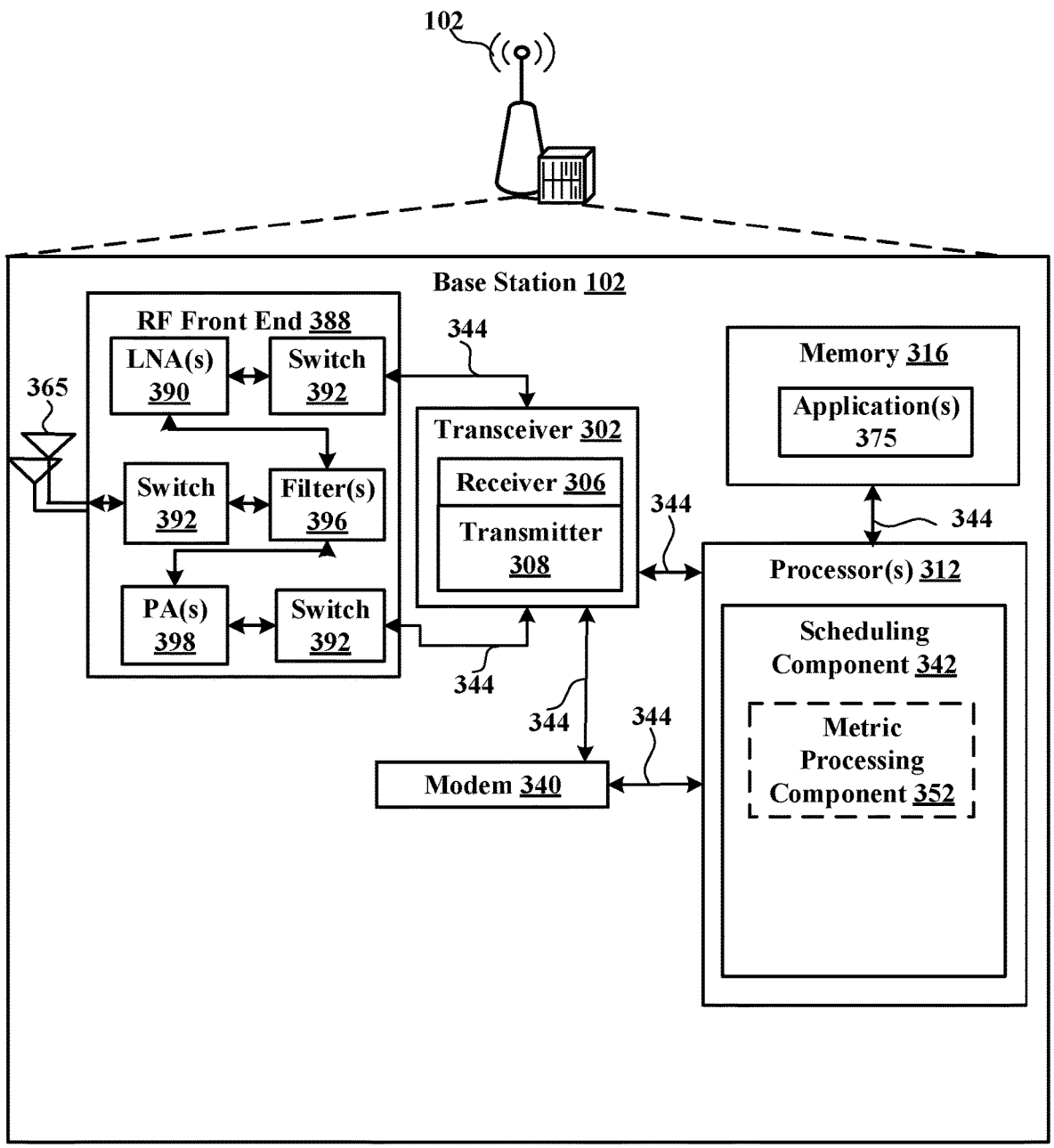
FIG. 3 is a block diagram illustrating an example of a base station, in accordance with various aspects of the present disclosure.
Figure 4:
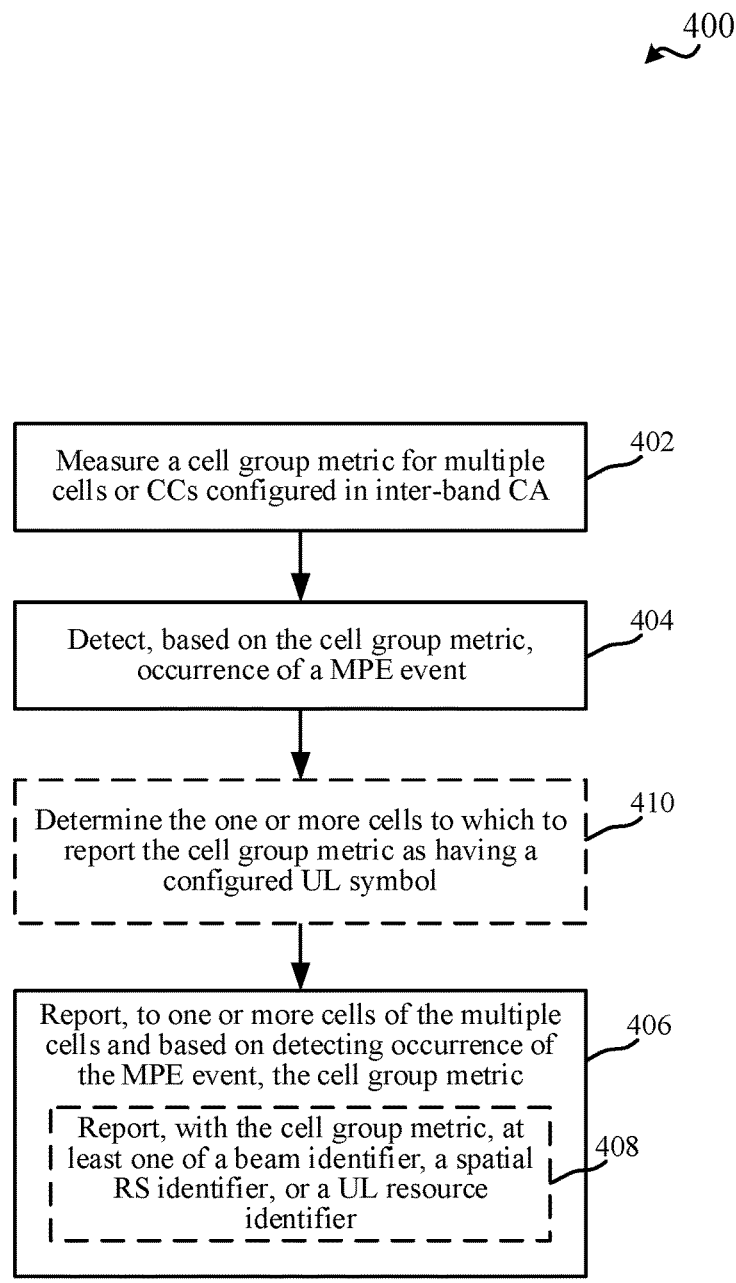
FIG. 4 is a flow chart illustrating an example of a method for detecting a maximum permissible exposure (MPE) event, in accordance with various aspects of the present disclosure.
Figure 5:
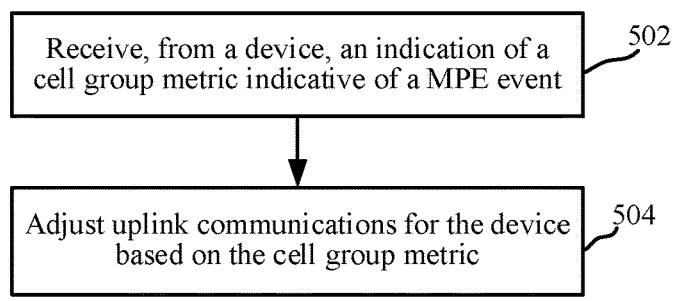
FIG. 5 is a flow chart illustrating an example of a method for receiving a report related to an MPE event, in accordance with various aspects of the present disclosure.

Turning now to FIGS. 2-8, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for detecting and/or reporting information related to a MPE event when inter-band CA is configured, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a metric determining component 252 for determining or computing a cell group metric related to an MPE event, and/or a MPE component 254 for detecting an MPE event based on the cell group metric, reporting the MPE event and/or cell group metric, etc., in accordance with aspects described herein.

In an aspect, the processor(s) 212 may correspond to one or more of the processors described in connection with the UE in FIG. 8. Similarly, the memory 216 may correspond to the memory described in connection with the UE in FIG. 8.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for configuring and/or communicating using inter-band CA, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a metric processing component 352 for receiving a cell group metric and processing the cell group metric (e.g., to adjust communications with a UE 104), in accordance with aspects described herein.

In an aspect, the processor(s) 312 may correspond to one or more of the processors described in connection with the base station in FIG. 8. Similarly, the memory 316 may correspond to the memory described in connection with the base station in FIG. 8.

FIG. 4 illustrates a flow chart of an example of a method 400 for detecting and/or reporting information related to an MPE event. In an example, a UE 104 can perform the functions described in method 400 using one or more of the components described in FIGS. 1 and 2.

In method 400, at Block 402, a cell group metric for multiple cells or CCs configured in inter-band CA can be measured. In an aspect, metric determining component 252, e.g., in conjunction with processor(s) 212, memory 216, transceiver 202, communicating component 242, etc., can measure the cell group metric for the multiple cells or CCs configured in inter-band CA. For example, metric determining component 252 can measure the cell group metric as a metric representative of the multiple cells or CCs configured in inter-band CA. The cell group metric may include a metric that is a function of a cell metric of all of the cells or CCs and/or at least for the cells or CCs in which the UE 104 is configured to transmit uplink communications. For example, the cell group metric may include a sum of cell metrics for the cells or CCs, a maximum or minimum cell group metric for the cells or CCs, an average of cell group metrics for the cells or CCs, individual values of cell group metrics for one or more of the cells or CCs, etc.

In a specific example, metric determining component 252 can measure the cell group metric as a total maximum power reduction (MPR) parameter value that is a sum of MPR parameter values configured for each of multiple cells or CCs that are providing the inter-band CA. For example, each cell can configure a MPR parameter value for the UE 104 to apply a power reduction in various scenarios in communicating with the cell or over one or more corresponding CCs. An example of a MPR parameter value used in fifth generation (5G) new radio (NR) is defined in third generation partnership project (3GPP) technical specification (TS) 38.101-2, which may include a MPR, additional MPR (A-MPR), power management MPR (P-MPR), etc., as described in sections 6.2A.1, 6.2A.2, 6.2A.3, 6.2.4.

For example, the total configured power PCMAX in a transmission occasion can be the sum of the configured power for carrier f of serving cell c with non-zero granted transmission power in the respective reference point. The total configured UE maximum output power PCMAX, as defined for 5G NR, can be set such that the corresponding measured total peak effective isotropic radiated power (EIRP) PUMAX is within the following bounds:

$$PPowerclass - MAX(MAX(MPR, A\_MPR), P\text{-}MPR) - MAX\{T(MAX(MPR, A\_MPR)), T(P\text{-}MPR)\} \leq PUMAX \leq EIRPmax$$

where PPowerclass represents the UE power class as specified in sub-clause 6.2A.1, EIRPmax represents the applicable maximum EIRP as specified in sub-clause 6.2A1, MPR is as specified in sub-clause 6.2A.2, A-MPR is as specified in sub-clause 6.2A.3, P-MPR the power management term for the UE as described in 6.2.4, and TRPmax represents the maximum total radiated power (TRP) for the UE power class as specified in sub-clause 6.2A.1. PUMAX is defined as $10*\log 10(\Sigma pUMAX, fli), c(j))$ for each carrier f (i=1 . . . n) and serving cell c (j=1 . . . m) where pUMAX,fli),c(j) is linear value of PUMAX,fli),c(j).

In an example, metric determining component 252 can measure the cell group metric as a total P-MPR=sum(P-MPRfi,cj), where P-MPRfi,cj is the P-MPR on carrier fi of cell cj, for multiple CCs and/or cells. For example, measuring the total P-MPR across cells and/or CCs can be a more accurate representation of a P-MPR metric for detecting an MPE event. In addition, the P-MPR can be beam specific such that metric determining component 252 determines the total P-MPR for a specific beam or set of specific beams used over each of the cells and/or CCs. For example, the specific beam or set of specific beams can be determined and used in beamforming by the cell in transmitting certain signals over the CCs, such as reference signals, which can be measured for determining P-MPR or other metrics. In an example, metric determining component 252 can detect the MPE event, and/or may report the cell group metric to one or more cells, where the total P-MPR is determined to achieve a threshold. The threshold can be prefixed to a default value, where prefixed as used herein can refer to the threshold being configured in memory 216 based on instructions implemented according to a radio access technology (RAT) specification, such as 5G NR, and not necessarily received in a network configuration. In other examples, however, the threshold can be additionally or alternatively semi-statically configured by radio resource control (RRC) signaling. For example, the MPE event can be detected and declared when the total P-MPR is greater than the threshold. In other examples, metric determining component 252 can measure the cell group metric as an average P-MPR, minimum or maximum P-MPR, etc. among cells or CCs, and can detect the MPE event, and/or may report the cell group metric to one or more cells, based on comparing the average P-MPR, minimum or maximum P-MPR, etc. to one or more thresholds. For example, the MPE event can be detected and declared when the average P-MPR is greater than the threshold.

In another example, metric determining component 252 can measure the cell group metric as a total power backoff across cells and/or corresponding CCs. For example, metric determining component 252 can measure the total power backoff as or based on a sum of required or otherwise specified transmit power for the cells or on the corresponding CCs. In a specific example, metric determining component 252 can measure the total power backoff according to:

PCMAX($i$)–sum($Pf_i, c_j, (i)$)), where $Pf_i, c_j, (i)$ is the required transmit power on carrier $f_i$ of cell $c_j$.

In an example, metric determining component 252 can detect the MPE event, and/or may report the cell group metric to one or more cells, where the total power backoff is determined to achieve a threshold. The threshold can be either prefixed, or configured by RRC signaling. For example, the MPE event can be detected and declared when the total power backoff is greater than the threshold. In other examples, metric determining component 252 can measure the cell group metric as an average power backoff, minimum or maximum power backoff, etc. among cells or CCs, and can detect the MPE event, and/or may report the cell group metric to one or more cells, based on comparing the average power backoff, minimum or maximum power backoff, etc. to one or more thresholds. For example, the MPE event can be detected and declared when the average power backoff is greater than the threshold.

In another example, metric determining component 252 can measure the cell group metric as a configured transmit power at an occasion i. For example, the occasion i may correspond to a division of time resources, such as a orthogonal frequency division multiplexing (OFDM) symbol, single-carrier frequency division multiplexing (SC-FDM) symbol, slot of multiple symbols, transmission time interval (TTI), etc. In addition, the configured transmit power at the occasion i can correspond to the maximum transmit power, PCMAX(i), configured transmit power at occasion i. In an example, metric determining component 252 can detect the MPE event, and/or may report the cell group metric to one or more cells, where the total configured transmit power is determined to not achieve a threshold. In other examples, metric determining component 252 can measure the cell group metric as an average configured transmit power, minimum or maximum configured transmit power, etc. among cells or CCs, and can detect the MPE event, and/or may report the cell group metric to one or more cells, based on comparing the average configured transmit power, minimum or maximum configured transmit power, etc. to one or more thresholds.

In another example, metric determining component 252 can measure or determine the cell group metric as multiple individual cell metrics indicative of cell metrics for one or more of the cells and/or CCs configured in CA. For example, metric determining component 252 can determine the multiple individual cell metrics as beam specific P-MPRs for each of the cells and/or CCs, beam specific duty cycles for each of the cells and/or CCs, etc., which metric determining component 252 can measure or determine based on reference signals or other signals transmitted by the cells and/or over the CCs using specific beams. In an example, metric determining component 252 can detect the MPE event, and/or may report the cell group metric to one or more cells based on comparing one or each of the multiple individual cell metrics to one or more thresholds. In addition, in an example, the UE 104 may detect MPR based on a portion of the multiple individual cell metrics (e.g., the cell metrics determined to achieve or not achieve one or more thresholds). In another example, the UE 104 may report the portion of the multiple individual cell metrics to one or more cells, as described further herein.

In another example, metric determining component 252 can measure the cell group metric as a total power headroom configured for each of multiple cells and/or CCs. For example, the power headroom for a cell or CC can refer to the amount of power available when considering the transmit power used by the UE 104 in transmitting in the cell or over the CC. Power headroom can be based on a real power headroom value as measured for transmitting actual communications over an uplink channel, or a virtual power headroom value related to a virtual transmission over an uplink channel. In an example, metric determining component 252 can detect the MPE event, and/or may report the cell group metric to one or more cells, where the total power headroom is determined to not achieve a threshold. In other examples, metric determining component 252 can measure the cell group metric as an average configured transmit power, minimum or maximum configured transmit power, etc. among cells or CCs, and can detect the MPE event, and/or may report the cell group metric to one or more cells, based on comparing the average configured transmit power, minimum or maximum configured transmit power, etc. to one or more thresholds. In yet another example, metric determining component 252 can determine the total power headroom based on considering an actual power headroom for one or more cells or CCs and a virtual power headroom for one or more other cells or CCs.

In method 400, at Block 404, occurrence of a MPE event can be detected based on the cell group metric. In an aspect, MPE component 254, e.g., in conjunction with processor(s) 212, memory 216, transceiver 202, communicating component 242, etc., can detect, based on the cell group metric, occurrence of the MPE event. For example, MPE component 254 can detect the MPE event based on comparing the cell group metric to a threshold. The threshold can be either prefixed, or configured by RRC signaling. In one example, the MPE event can be detected when the cell group metric is greater than the threshold. In another example, the MPE event can be detected when the cell group metric is less than the threshold. Various examples are described above with reference to Block 402.

In method 400, at Block 406, the cell group metric can be reported to one or more cells of the multiple cells and based on detecting occurrence of the MPE event. In an aspect, MPE component 254, e.g., in conjunction with processor(s) 212, memory 216, transceiver 202, communicating component 242, etc., can report, to the one or more cells of the multiple cells and based on detecting occurrence of the MPE event, the cell group metric. For example, MPE component 254 can report the cell group metric to cells that have a valid uplink transmission in a time occasion that corresponds to a reporting opportunity. For example, a time occasion may include one or more symbols or one or more slots of symbols, and the reporting opportunity may be specified by one or more of the cells for the UE 104 to report the cell group metric, beam identifiers, etc., as described herein. The cells with the valid uplink transmission may be cells that the MPE component 254 determines to have configured or indicated valid uplink symbols in a slot format. MPE component 254 may report the cell group metric to these cells, but perhaps not to other cells that may be configured in CA. In addition, for example, MPE component 254 can report the cell group metric in a media access control (MAC) control element (CE), an uplink report in uplink control information (UCI), etc. Reporting the cell group metric in this regard may allow the cells to configure uplink transmissions for the UE 104 based on the cell group metric, in one example.

In reporting the cell group metric at Block 406, optionally at Block 408, at least one of a beam identifier, a spatial reference signal (RS) identifier, or an uplink resource identifier may be reported with the cell group metric. In an aspect, MPE component 254, e.g., in conjunction with processor(s) 212, memory 216, transceiver 202, communicating component 242, etc., can report, with the cell group metric, at least one of the beam identifier, the spatial RS identifier, or the uplink resource identifier. For example, this can include the beam identifier, spatial RS identifier, or uplink resource identifiers corresponding to the one or more cells receiving the report, which may assist the cell in determining other information in the report. For example, the beam identifier may include an uplink beam identifier, such as a scheduling request indicator (SRI) for physical uplink shared channel (PUSCH), physical uplink control channel (PUCCH) spatial relation identifier, sounding reference signal (SRS) spatial relation reference signal, etc. In another example, the spatial RS identifier may include a channel state information reference signal (CSI-RS) resource identifier, synchronization signal block (SSB) identifier, etc. In another example, the uplink resource identifier may include a PUCCH/SRS resource identifier, SRS resource set identifier, etc. In any case, for example, the report can include some identification on signals, on which the cell group metric can be based. A specific example is shown in FIG. 6.

FIG. 6 illustrates examples of bitmaps 600, 602 of reports for reporting cell group metrics. Bitmap 600 includes a set of bits including single bit indicators for indicating whether the report includes metrics for different cells (C7, C6, C5, C4, C3, C2, C1, C0). In bitmap 600, bits C3 and C4 can be set to 1 to indicate that the report includes metrics for cells C3 and C4. Bitmap 600 also includes the cell group metric, which can be one of the values described in examples above, and includes a bandwidth part (BWP) identifier and beam identifier for C3 and a BWP identifier and beam identifier for C4. The UE 104 can transmit this report to cells C3 and C4, which can use the report, based on this format, to determine the cell group metric and accordingly adjust uplink parameters for the UE 104. Bitmap 602 is another format for the report that includes individual cell metrics. For example, bitmap 602 includes the cell group metric as a set of individual cell group metrics shown as beam specific metric C3 and beam specific metric C4, which are respectively followed by the BWP identifiers and beam identifiers for C3 and C4. The UE 104 can transmit this report to cells C3 and C4, which can use the report, based on this format, to determine the individual cell metric for themselves, and/or for multiple cells, and accordingly adjust uplink parameters for the UE 104. In one example, a cell can determine the beam specific metrics for each cell, and can compute the total, average, maximum or minimum, etc. values, as described above, for determining adjustment for uplink communications considering all of the metrics.

In method 400, optionally at Block 410, the one or more cells to which to report the cell group metric as having a configured uplink symbol can be determined. In an aspect, MPE component 254, e.g., in conjunction with processor(s) 212, memory 216, transceiver 202, communicating component 242, etc., can determine the one or more cells to which to report the cell group metric as having a configured uplink symbol. As described, MPE component 254 can determine which configured cells or CCs have an uplink occasion (e.g., an uplink symbol) in an occasion during which the UE 104 is reporting a cell group metric report, which may not include all cells or CCs configured in CA for the UE 104. In an example, each cell can configure a slot format indicating whether symbols in the slot are for downlink communications (D), uplink communications (U), or flexible (F) for downlink or uplink communications. Based on the slot format, for example, MPE component 254 (or more generally communicating component 242) can determine whether a given symbol is configured for uplink communications for a given cell or CC. A specific example is shown in FIG. 7.

Figure 7:
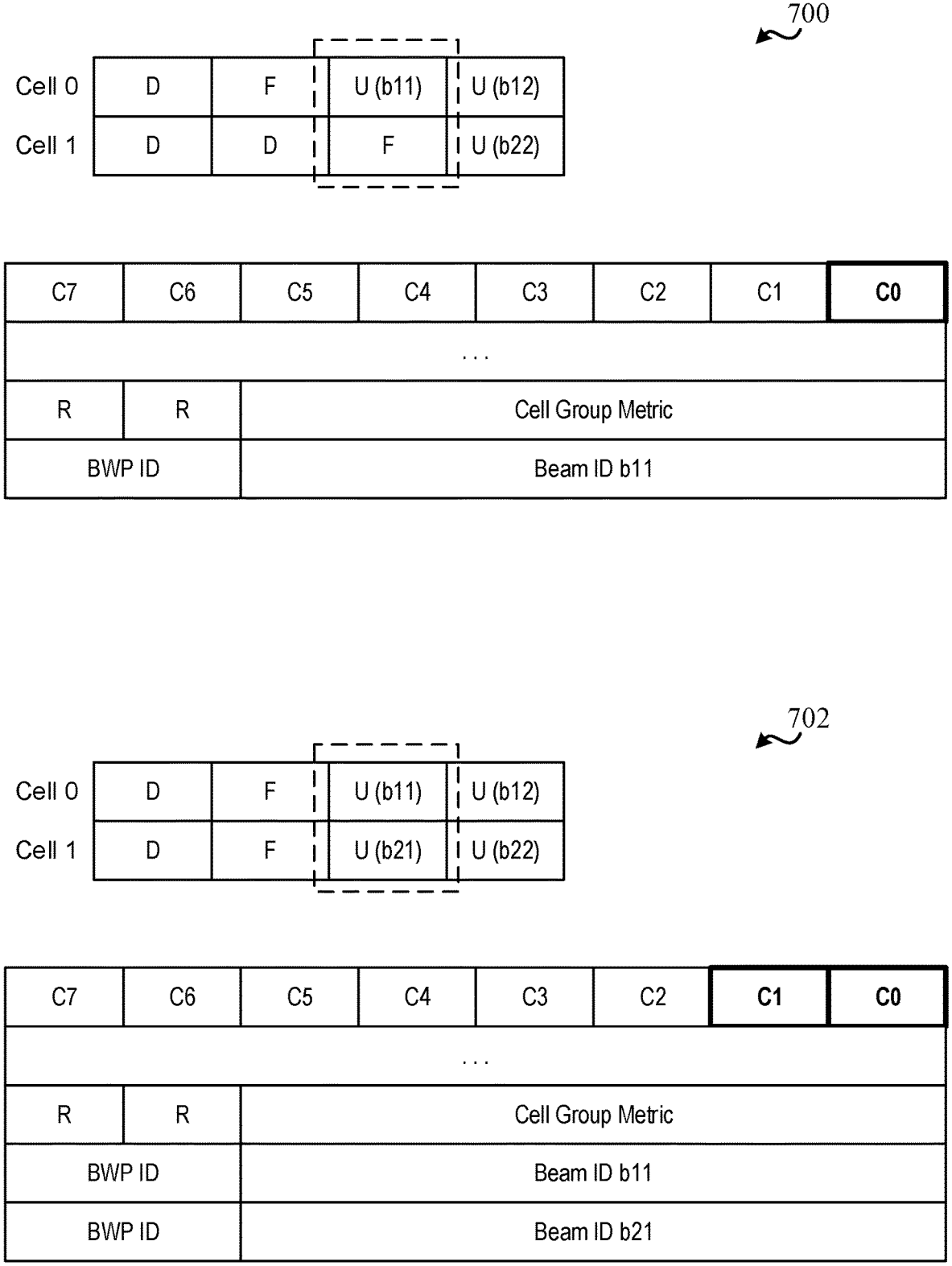
FIG. 7 illustrates examples of bitmaps for different slot formats for reporting MPE information, in accordance with various aspects of the present disclosure.

FIG. 7 illustrates examples of slot formats and corresponding bitmaps 700, 702 for reporting cell group metrics. In slot format and corresponding bitmap 700, the slot format indicates a third symbol for cell 0 as being uplink (and using beam b11) and for cell 1 as being flexible. In this example, MPE component 254 can generate and transmit the report for cell 0 in the third symbol, but not for cell 1. In this example, in the corresponding bitmap, bit C0 is set to 1 for cell 0, and the bitmap also includes the cell group metric, which can be one of the values described in examples above, and includes a BWP identifier and beam identifier for C0. In addition, in an example, the beam for cell 0 may switch to beam 12 in the next symbol, which may be based on cell 0 receiving the report and determining, based at least in part on the cell group metric, to use a different beam for the UE 104 to mitigate MPE.

In slot format and corresponding bitmap 702, the slot format indicates a third symbol for cell 0 as being uplink (and using beam b11) and for cell 1 as being uplink (and using beam 21). In this example, MPE component 254 can generate and transmit the report for cell 0 and cell 1 in the third symbol. In this example, in the corresponding bitmap, bits C0 and C1 are set to 1 for cell 0 and cell 1, and the bitmap also includes the cell group metric, which can be one of the values described in examples above, and includes a BWP identifier and beam identifier for C0 and a BWP identifier and beam identifier for C1. In addition, in an example, the beam for cell 0 may switch to beam 12 in the next symbol, which may be based on cell 0 receiving the report and determining, based at least in part on the cell group metric, to use a different beam for the UE 104 to mitigate MPE. Similarly, the beam for cell 1 may switch to beam 22 in the next symbol, which may be based on cell 1 receiving the report and determining, based at least in part on the cell group metric, to use a different beam for the UE 104 to mitigate MPE.

FIG. 5 illustrates a flow chart of an example of a method 500 for receiving a cell group metric, in accordance with aspects described herein. In an example, a base station 102 can perform the functions described in method 500 using one or more of the components described in FIGS. 1 and 3.

In method 500, at Block 502, an indication of a cell group metric indicative of a MPE event can be received from a device. In an aspect, metric processing component 352, e.g., in conjunction with processor(s) 312, memory 316, transceiver 302, scheduling component 342, etc., can receive, from the device (e.g., UE 104), the indication of the cell group metric indicating of the MPE event. For example, metric processing component 352 can receive the indication of the cell group metric in the report formats described above, which may include the cell group metric and identifiers related to each cell, including a cell provided by the base station 102. In addition, for example, the cell group metric can include one or more of the parameter values described above with reference to Block 402, such as a total P-MPR, total power backoff, PCMAX, individual cell metrics, total power headroom, an average, minimum or maximum of such values, etc.

In method 500, at Block 504, uplink communications for the device can be adjusted based on the cell group metric. In an aspect, scheduling component 342, e.g., in conjunction with processor(s) 312, memory 316, transceiver 302, etc., can adjust uplink communications for the device based on the cell group metric. For example, scheduling component 342 can modify an uplink transmit power to be used by the UE 104 based on the cell group metric such to avoid MPE. In another example, scheduling component 342 can adjust uplink resource allocation for the UE 104 based on the cell group metric such to avoid MPE. In one example, scheduling component 342 may reduce a number of uplink resources to lessen power used by the UE 104 an lower likelihood of MPS. Moreover, in an example, scheduling component 342 can perform beam switching for the UE 104 to switch a beam for UE 104 communications based on the cell group metric such to avoid MPE. For example, using a beam that is beamformed in a different direction than a current beam may avoid MPE based on redirecting signal energy.

Figure 8:
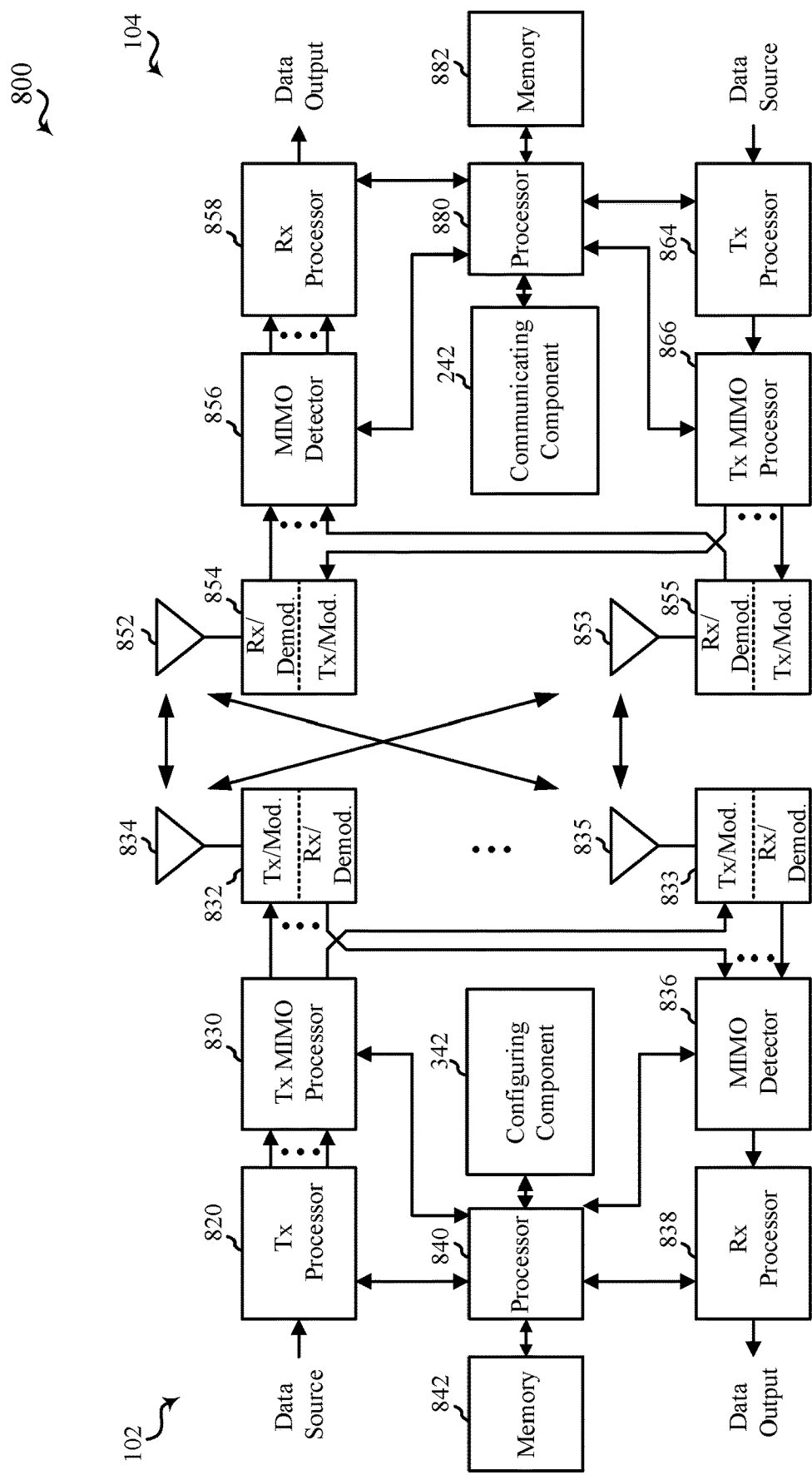
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 is a method for wireless communication including measuring a cell group metric for multiple cells configured in inter-band CA, detecting, based on the cell group metric, occurrence of a MPE event, and reporting, to one or more cells of the multiple cells and based on detecting occurrence of the MPE event, the cell group metric.

In Aspect 2, the method of Aspect 1 includes wherein the cell group metric includes a total maximum power reduction parameter value that is a sum of maximum power reduction parameter values for each of the multiple cells, and wherein detecting occurrence of the MPE event is based on determining that the total maximum power reduction parameter value achieves a threshold.

In Aspect 3, the method of any of Aspects 1 or 2 includes wherein the cell group metric includes a total power backoff parameter value that is a difference of a maximum transmit power and a transmit power allocated for transmitting communications in each of the multiple cells, and wherein detecting occurrence of the MPE event is based on determining that the total power backoff parameter value achieves a threshold.

In Aspect 4, the method of any of Aspects 1 to 3 includes wherein the cell group metric includes a maximum transmit power, and wherein detecting occurrence of the MPE event is based on determining that the maximum transmit power does not achieve a threshold.

In Aspect 5, the method of any of Aspects 1 to 4 includes wherein the cell group metric includes a metric of one of the multiple cells, and wherein detecting occurrence of the MPE event is based on the metric of one of the multiple cells.

In Aspect 6, the method of any of Aspects 1 to 5 includes wherein the cell group metric includes a total power headroom value that is a sum of power headroom values for communications in each of the multiple cells, and wherein detecting occurrence of the MPE event is based on determining that the total power headroom value does not achieve a threshold.

In Aspect 7, the method of any of Aspects 1 to 6 includes reporting, with the cell group metric, at least one of a beam identifier, a spatial reference signal identifier, or a uplink resource identifier, for each of the one or more cells.

In Aspect 8, the method of any of Aspects 1 to 7 includes determining the one or more cells to which to report the cell group metric as having a configured uplink symbol.

Aspect 9 is a method for wireless communication including receiving, from a device, an indication of a cell group metric indicative of a MPE event, wherein the cell group metric corresponds to multiple cells configured in inter-band CA, and adjusting uplink communications for the device based on the cell group metric.

In Aspect 10, the method of Aspect 9 includes wherein adjusting uplink communications includes refraining from scheduling uplink resources for the device.

In Aspect 11, the method of any of Aspects 9 or 10 includes wherein adjusting uplink communications includes selecting a different beam for the device to use in transmitting uplink communications.

Aspect 12 is an apparatus for wireless communication including a transceiver, a memory configured to store instructions, and one or more processors communicatively coupled with the memory and the transceiver, wherein the one or more processors are configured to measure a cell group metric for multiple cells configured in inter-band CA, detect, based on the cell group metric, occurrence of a MPE event, and report, to one or more cells of the multiple cells and based on detecting occurrence of the MPE event, the cell group metric.

In Aspect 13, the apparatus of Aspect 12 includes wherein the cell group metric includes a total maximum power reduction parameter value that is a sum of maximum power reduction parameter values for each of the multiple cells, and wherein the one or more processors are configured to detect occurrence of the MPE event based on determining that the total maximum power reduction parameter value achieves a threshold.

In Aspect 14, the apparatus of any of Aspects 12 or 13 includes wherein the cell group metric includes a total power backoff parameter value that is a difference of a maximum transmit power and a transmit power allocated for transmitting communications in each of the multiple cells, and wherein the one or more processors are configured to detect occurrence of the MPE event based on determining that the total power backoff parameter value achieves a threshold.

In Aspect 15, the apparatus of any of Aspects 12 to 14 includes wherein the cell group metric includes a maximum transmit power, and wherein the one or more processors are configured to detect occurrence of the MPE event based on determining that the maximum transmit power does not achieve a threshold.

In Aspect 16, the apparatus of any of Aspects 12 to 15 includes wherein the cell group metric includes a metric of one of the multiple cells, and wherein the one or more processors are configured to detect occurrence of the MPE event based on the metric of one of the multiple cells.

In Aspect 17, the apparatus of any of Aspects 12 to 16 includes wherein the cell group metric includes a total power headroom value that is a sum of power headroom values for communications in each of the multiple cells, and wherein the one or more processors are configured to detect of the MPE event based on determining that the total power headroom value does not achieve a threshold.

In Aspect 18, the apparatus of any of Aspects 12 to 17 includes wherein the one or more processors are further configured to report, with the cell group metric, at least one of a beam identifier, a spatial reference signal identifier, or a uplink resource identifier, for each of the one or more cells.

In Aspect 19, the apparatus of any of Aspects 12 to 18 includes wherein the one or more processors are further configured to determine the one or more cells to which to report the cell group metric as having a configured uplink symbol.

Aspect 20 is an apparatus for wireless communication including a transceiver, a memory configured to store instructions, and one or more processors communicatively coupled with the memory and the transceiver, wherein the one or more processors are configured to receive, from a device, an indication of a cell group metric indicative of a MPE event, wherein the cell group metric corresponds to multiple cells configured in inter-band CA, and adjust uplink communications for the device based on the cell group metric.

In Aspect 21, the apparatus of Aspect 20 includes wherein the one or more processors are configured to adjust uplink communications at least in part by refraining from scheduling uplink resources for the device.

In Aspect 22, the apparatus of any of Aspects 20 or 21 includes wherein the one or more processors are configured to adjust uplink communications at least in part by selecting a different beam for the device to use in transmitting uplink communications.

Aspect 23 is an apparatus for wireless communication including means for measuring a cell group metric for multiple cells configured in inter-band CA, means for detecting, based on the cell group metric, occurrence of a MPE event, and means for reporting, to one or more cells of the multiple cells and based on detecting occurrence of the MPE event, the cell group metric.

In Aspect 24, the apparatus of Aspect 23 includes wherein the cell group metric includes a total maximum power reduction parameter value that is a sum of maximum power reduction parameter values for each of the multiple cells, and wherein the means for detecting detects occurrence of the MPE event based on determining that the total maximum power reduction parameter value achieves a threshold.

In Aspect 25, the apparatus of any of Aspects 23 or 24 includes wherein the cell group metric includes a total power backoff parameter value that is a difference of a maximum transmit power and a transmit power allocated for transmitting communications in each of the multiple cells, and wherein the means for detecting detects occurrence of the MPE event based on determining that the total power backoff parameter value achieves a threshold.

In Aspect 26, the apparatus of any of Aspects 23 to 25 includes wherein the cell group metric includes a maximum transmit power, and wherein the means for detecting detects occurrence of the MPE event based on determining that the maximum transmit power does not achieve a threshold.

In Aspect 27, the apparatus of any of Aspects 23 to 26 includes wherein the cell group metric includes a metric of one of the multiple cells, and wherein the means for detecting detects occurrence of the MPE event based on the metric of one of the multiple cells.

In Aspect 28, the apparatus of any of Aspects 23 to 27 includes wherein the cell group metric includes a total power headroom value that is a sum of power headroom values for communications in each of the multiple cells, and wherein the means for detecting detects occurrence of the MPE event based on determining that the total power headroom value does not achieve a threshold.

In Aspect 29, the apparatus of any of Aspects 23 to 28 includes means for reporting, with the cell group metric, at least one of a beam identifier, a spatial reference signal identifier, or a uplink resource identifier, for each of the one or more cells.

In Aspect 30, the apparatus of any of Aspects 23 to 29 includes means for determining the one or more cells to which to report the cell group metric as having a configured uplink symbol.

Aspect 31 is an apparatus for wireless communication including means for receiving, from a device, an indication of a cell group metric indicative of a MPE event, wherein the cell group metric corresponds to multiple cells configured in inter-band CA, and means for adjusting uplink communications for the device based on the cell group metric.

In Aspect 32, the apparatus of Aspect 31 includes wherein the means for adjusting adjusts uplink communications at least in part by refraining from scheduling uplink resources for the device.

In Aspect 33, the apparatus of any of Aspects 31 or 32 includes wherein the means for adjusting adjusts uplink communications at least in part by selecting a different beam for the device to use in transmitting uplink communications.

Aspect 34 is a computer-readable medium including code executable by one or more processors for wireless communications, the code including code for measuring a cell group metric for multiple cells configured in inter-band CA, detecting, based on the cell group metric, occurrence of a MPE event, and reporting, to one or more cells of the multiple cells and based on detecting occurrence of the MPE event, the cell group metric.

In Aspect 35, the computer-readable medium of Aspect 34 includes wherein the cell group metric includes a total maximum power reduction parameter value that is a sum of maximum power reduction parameter values for each of the multiple cells, and wherein the code for detecting detects occurrence of the MPE event based on determining that the total maximum power reduction parameter value achieves a threshold.

In Aspect 36, the computer-readable medium of any of Aspects 34 or 35 includes wherein the cell group metric includes a total power backoff parameter value that is a difference of a maximum transmit power and a transmit power allocated for transmitting communications in each of the multiple cells, and wherein the code for detecting detects occurrence of the MPE event based on determining that the total power backoff parameter value achieves a threshold.

In Aspect 37, the computer-readable medium of any of Aspects 34 to 36 includes wherein the cell group metric includes a maximum transmit power, and wherein the code for detecting detects occurrence of the MPE event based on determining that the maximum transmit power does not achieve a threshold.

In Aspect 38, the computer-readable medium of any of Aspects 34 to 37 includes wherein the cell group metric includes a metric of one of the multiple cells, and wherein the code for detecting detects occurrence of the MPE event based on the metric of one of the multiple cells.

In Aspect 39, the computer-readable medium of any of Aspects 34 to 38 includes wherein the cell group metric includes a total power headroom value that is a sum of power headroom values for communications in each of the multiple cells, and wherein the code for detecting detects occurrence of the MPE event based on determining that the total power headroom value does not achieve a threshold.

In Aspect 40, the computer-readable medium of any of Aspects 34 to 39 includes code for reporting, with the cell group metric, at least one of a beam identifier, a spatial reference signal identifier, or a uplink resource identifier, for each of the one or more cells.

In Aspect 41, the computer-readable medium of any of Aspects 34 to 40 includes code for determining the one or more cells to which to report the cell group metric as having a configured uplink symbol.

Aspect 42 is a computer-readable medium including code executable by one or more processors for wireless communications, the code including code for receiving, from a device, an indication of a cell group metric indicative of a MPE event, wherein the cell group metric corresponds to multiple cells configured in inter-band CA, and adjusting uplink communications for the device based on the cell group metric.

In Aspect 43, the computer-readable medium of Aspect 42 includes wherein the code for adjusting adjusts uplink communications at least in part by refraining from scheduling uplink resources for the device.

In Aspect 44, the computer-readable medium of any of Aspects 42 or 43 includes wherein the code for adjusting adjusts uplink communications at least in part by selecting a different beam for the device to use in transmitting uplink communications.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of" "A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the memory and the transceiver, wherein the one or more processors are configured to:
measure a cell group metric for multiple cells configured in inter-band carrier aggregation (CA);
detect, based on the cell group metric, occurrence of a maximum permissible exposure (MPE) event; and
report, to one or more cells of the multiple cells and based on detecting occurrence of the MPE event, the cell group metric.

2. The apparatus of claim 1, wherein the cell group metric includes a total maximum power reduction parameter value that is based on maximum power reduction parameter values for each of the multiple cells, and wherein the one or more processors are configured to detect occurrence of the MPE event based on determining that the total maximum power reduction parameter value achieves a threshold.

3. The apparatus of claim 1, wherein the cell group metric includes a total power headroom value that is based on power headroom values for communications in each of the multiple cells, and wherein the one or more processors are configured to detect occurrence of the MPE event based on determining that the total power headroom value does not achieve a threshold.

4. The apparatus of claim 3, wherein the power headroom values on which the total power headroom value is based includes virtual power headroom values for communications in each of the multiple cells.

5. The apparatus of claim 1, wherein the cell group metric includes a total power backoff parameter value that is a difference of a maximum transmit power and a transmit power allocated for transmitting communications in each of the multiple cells, and wherein the one or more processors are configured to detect occurrence of the MPE event based on determining that the total power backoff parameter value achieves a threshold.

6. The apparatus of claim 1, wherein the cell group metric includes a maximum transmit power, and wherein the one or more processors are configured to detect occurrence of the MPE event based on determining that the maximum transmit power does not achieve a threshold.

7. The apparatus of claim 1, wherein the cell group metric includes a metric of one of the multiple cells, and wherein the one or more processors are configured to detect occurrence of the MPE event based on the metric of one of the multiple cells.

8. The apparatus of claim 1, wherein the one or more processors are further configured to report, with the cell group metric, at least one of a beam identifier, a spatial reference signal identifier, or a uplink resource identifier, for each of the one or more cells.

9. The apparatus of claim 1, wherein the one or more processors are configured to determine the one or more cells to which to report the cell group metric as having a configured uplink symbol.

10. An apparatus for wireless communication, comprising:
a transceiver;
a memory configured to store instructions; and
one or more processors communicatively coupled with the memory and the transceiver, wherein the one or more processors are configured to:
receive, from a device, an indication of a cell group metric indicative of a maximum permissible exposure (MPE) event, wherein the cell group metric corresponds to multiple cells configured in inter-band carrier aggregation (CA); and
adjust uplink communications for the device based on the cell group metric.

11. The apparatus of claim 10, wherein the one or more processors are configured to adjust uplink communications at least in part by refraining from scheduling uplink resources for the device.

12. The apparatus of claim 10, wherein the one or more processors are configured to adjust uplink communications at least in part by selecting a different beam for the device to use in transmitting uplink communications.

13. The apparatus of claim 10, wherein the cell group metric includes a total maximum power reduction parameter value that is based on maximum power reduction parameter values for each of the multiple cells.

14. The apparatus of claim 10, wherein the cell group metric includes a total power headroom value that is based on power headroom values for communications in each of the multiple cells.

15. The apparatus of claim 14, wherein the power headroom values on which the total power headroom value is based includes virtual power headroom values for communications in each of the multiple cells.

16. A method for wireless communication, comprising:
measuring a cell group metric for multiple cells configured in inter-band carrier aggregation (CA);
detecting, based on the cell group metric, occurrence of a maximum permissible exposure (MPE) event; and
reporting, to one or more cells of the multiple cells and based on detecting occurrence of the MPE event, the cell group metric.

17. The method of claim 16, wherein the cell group metric includes a total maximum power reduction parameter value that is based on maximum power reduction parameter values for each of the multiple cells, and wherein detecting occurrence of the MPE event is based on determining that the total maximum power reduction parameter value achieves a threshold.

18. The method of claim 16, wherein the cell group metric includes a total power headroom value that is based on power headroom values for communications in each of the multiple cells, and wherein detecting occurrence of the MPE event is based on determining that the total power headroom value does not achieve a threshold.

19. The method of claim 18, wherein the power headroom values on which the total power headroom value is based includes virtual power headroom values for communications in each of the multiple cells.

20. The method of claim 16, wherein the cell group metric includes a total power backoff parameter value that is a difference of a maximum transmit power and a transmit power allocated for transmitting communications in each of the multiple cells, and wherein detecting occurrence of the MPE event is based on determining that the total power backoff parameter value achieves a threshold.

21. The method of claim 16, wherein the cell group metric includes a maximum transmit power, and wherein detecting occurrence of the MPE event is based on determining that the maximum transmit power does not achieve a threshold.

22. The method of claim 16, wherein the cell group metric includes a metric of one of the multiple cells, and wherein detecting occurrence of the MPE event is based on the metric of one of the multiple cells.

23. The method of claim 16, further comprising reporting, with the cell group metric, at least one of a beam identifier, a spatial reference signal identifier, or a uplink resource identifier, for each of the one or more cells.

24. The method of claim 16, further comprising determining the one or more cells to which to report the cell group metric as having a configured uplink symbol.

25. A method for wireless communication, comprising:
receiving, from a device, an indication of a cell group metric indicative of a maximum permissible exposure (MPE) event, wherein the cell group metric corresponds to multiple cells configured in inter-band carrier aggregation (CA); and
adjusting uplink communications for the device based on the cell group metric.

26. The method of claim 25, wherein adjusting uplink communications includes refraining from scheduling uplink resources for the device.

27. The method of claim 25, wherein adjusting uplink communications includes selecting a different beam for the device to use in transmitting uplink communications.

28. The method of claim 25, wherein the cell group metric includes a total maximum power reduction parameter value that is based on maximum power reduction parameter values for each of the multiple cells.

29. The method of claim 25, wherein the cell group metric includes a total power headroom value that is based on power headroom values for communications in each of the multiple cells.

30. The method of claim 29, wherein the power headroom values on which the total power headroom value is based includes virtual power headroom values for communications in each of the multiple cells.

* * * * *